(12) United States Patent
Burkett et al.

(10) Patent No.: US 7,672,437 B2
(45) Date of Patent: *Mar. 2, 2010

(54) SYSTEM AND METHOD FOR PROCESSING TRAFFIC STUDY REQUESTS

(75) Inventors: Chuck Burkett, Woodbury, GA (US); Annette Kendrick, High Springs, FL (US); Linda Dodds, Micanopy, FL (US); Jewel Smith, Orlando, FL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 184 days.

This patent is subject to a terminal disclaimer.

(21) Appl. No.: 11/900,312

(22) Filed: Sep. 11, 2007

(65) Prior Publication Data

US 2008/0056471 A1 Mar. 6, 2008

Related U.S. Application Data

(63) Continuation of application No. 10/259,447, filed on Sep. 30, 2002, now Pat. No. 7,269,250.

(51) Int. Cl.
*H04M 15/00* (2006.01)

(52) U.S. Cl. ............ 379/112.06; 379/133; 379/112.01; 379/112.05

(58) Field of Classification Search ................ 379/111, 379/112.01, 112.05, 112.06, 112.08, 112.09, 379/114.01, 115.01–116, 119, 126, 133, 379/134

See application file for complete search history.

(56) References Cited

U.S. PATENT DOCUMENTS 7,269,250 B2 * 9/2007 Burkett et al. .......... 379/112.06

* cited by examiner

*Primary Examiner*—Quoc D Tran
(74) *Attorney, Agent, or Firm*—Scott P. Zimmerman PLLC

(57) ABSTRACT

A system and method for processing traffic study requests in a communications network. The system provides a log-in window for a user identification validation. If a user is an authorized user of the system, the system provides a window for displaying a CPNI disclaimer. The system provides a new order request window for receiving customer information and input parameters. The system provides a new study request window for receiving a telephone number to be studied. Once the traffic study is completed, the system receives a report of the traffic study. The system then forwards the report to the user.

19 Claims, 6 Drawing Sheets

FIG. 2

Order/Study Request Status — 200

View by Tracking Number ▽    View by Week ▽ 02-04-01

New Order — 218

| Tracking Number | Order Number | | | Study Number | | | Status | Directory Number |
|---|---|---|---|---|---|---|---|---|
| TR-02/04/2001-8283 | 02/04/2001-008283 | Modify Study | Cancel Study | 008283-001 | Modify Study | Cancel Study | Study Entered | (770) 939-6404 |
| | 02/04/2001-008284 | Modify Study | Cancel Study | 008284-001 | Modify Study | Cancel Study | Study Entered | (770) 934-7303 |

202 — Tracking Number
204 — Order Number
206 — Study Number
208 — Status
210, 212 — Modify Study / Cancel Study (Order)
214, 216 — Modify Study / Cancel Study (Study)

FIG. 3

New Order Request — 300

Tracking Number (Generated by System)

Customer Name

302 { Customer City/State

Contact Name

304 { Contact Phone
Contact Fax
Contact Email
Contact RC Code
Department

310 { Main List Number

306 {
312 — Start/End Date: 6/3/2001 ▷  6/9/2001 ▷
314 — Start/End Time: 8:00 am ▷  5:00 pm ▷
316 — Study Days: ☐ Sun ☐ Mon ☐ Tue ☐ Wed
                  ☐ Thu ☐ Fri ☐ Sat 308 { Delivery Options: ☐ Online ☐ Email ☐ Fax
      Customer Requested: ☐ Sun 320 — Submit        322 — Cancel

SYSTEM AND METHOD FOR PROCESSING TRAFFIC STUDY REQUESTS

CROSS-REFERENCE TO RELATED APPLICATIONS

This application is a continuation of U.S. application Ser. No. 10/259,447, filed Sep. 30, 2002, and now issued as U.S. Pat. No. 7,269,250.

BACKGROUND

1. Field of the Invention

The present invention relates generally to telecommunications networks and, more particularly, to a system and method for processing traffic study requests.

2. Background of the Invention

Traffic studies are generally performed for marketing, network planning, and various other reasons. Data from a traffic study can be used to generate revenue, analyze new services, resolve customer complaints, and provide better switch efficiency. For example, traffic studies can be performed to determine whether new lines are needed to provide a better service to customers. Similarly, traffic studies of existing lines can be performed to determine how may new lines are needed to improve an existing service.

Performing a traffic study is a tedious process. It is a very labor-intensive and time-consuming process. For example, when a customer service representative receives a traffic study request from a customer, the representative manually fills out a study request form that includes telephone numbers of those lines to be studied. The customer service representative forwards the study request form to a study group member for further processing. Upon receiving the study request form, the study group member manually verifies pertinent information on the study request form to make sure that the form was properly filled out. The study group member then verifies a location of a central office switch at which traffic associated with the telephone numbers are handled. Thereafter, a network assistant accesses the central office switch, verifies the actual numbers and the type of facilities involved. The network assistant then manually sets up a traffic data collector system to collect data from the switch and sets up the study. The collected data is then manually calculated and a report is prepared. When the report is completed, the report is faxed, mailed, or e-mailed to the customer service representative. The customer service representative then forwards the report to the customer.

SUMMARY OF THE INVENTION

The present invention provides a system and method for automating a traffic study request in a communications network. The system and method of the present invention automates the steps of receiving and processing a traffic study order in a communications network. The system and method of the present invention receives a traffic study order including a telephone number from a user, locates a central office serving the telephone number, initiates the traffic study, and provides a report of the traffic study to the user without traditional manual process.

In an embodiment, the system includes a set-up module, a reporting module, and a database. The set-up module receives a traffic study order that includes a telephone number from a user. The system uses the database to locate a central office that serves the telephone number and to verify whether the telephone number is an LNP number. The set-up module then initiates the traffic study in a traffic study unit. The reporting module receives a report of the traffic study from the traffic study unit and forwards the report to the user.

In another embodiment, the system includes an user identification validation module, a disclaimer module, a order request module, a study request module, a first database, a second database, and a reporting module. The user identification validation module validates a user identification received from a user. The disclaimer module provides a CPNI disclaimer. The order request module provides a first window adapted to receive customer information and input parameters for a traffic study order from the user. The first window also automatically displays user information previously obtained from the user. The study request module provides a second module adapted to receive a telephone number from the user. When the system receives a traffic study order, the system uses the first database to verify a location of the central office that serves the submitted telephone number. The system uses the second database to verify whether the telephone number is a local number portability (LNP) number. The system then initiates the traffic study in traffic study unit. Once the traffic study is completed, the system receives a report from the traffic study unit. The reporting module of the system forwards the report to the user. Further, the system may include an administration module for providing administrative reports, and an error notification module for providing an error notification.

In another embodiment, the system locates a central office that serves the LNP number.

In another embodiment, the system receives a plurality of telephone numbers associated with one or more central offices.

In another embodiment, the system provides options for a delivery of the report to the user.

In another embodiment, the invention provides a first window for validating a user identification received from a user, a second window for displaying a CPNI disclaimer, a third window for automatically displaying user information obtained from a user directory and for receiving from the user input parameters for a traffic study, and a fourth window for receiving a telephone number to be studied.

In another embodiment, the present invention can be adapted to provide a window for displaying a status of a pending order and to allow the user to modify the pending order.

BRIEF DESCRIPTION OF THE DRAWINGS

FIG. 2 is an exemplary status window according to a preferred embodiment of the present invention.

FIG. 3 is an exemplary new order request window according to a preferred embodiment of the present invention.

DETAILED DESCRIPTION OF THE INVENTION

Reference will now be made in detail to the preferred embodiments of the present invention, examples of which are illustrated in the accompanying drawings.

Figure 1:
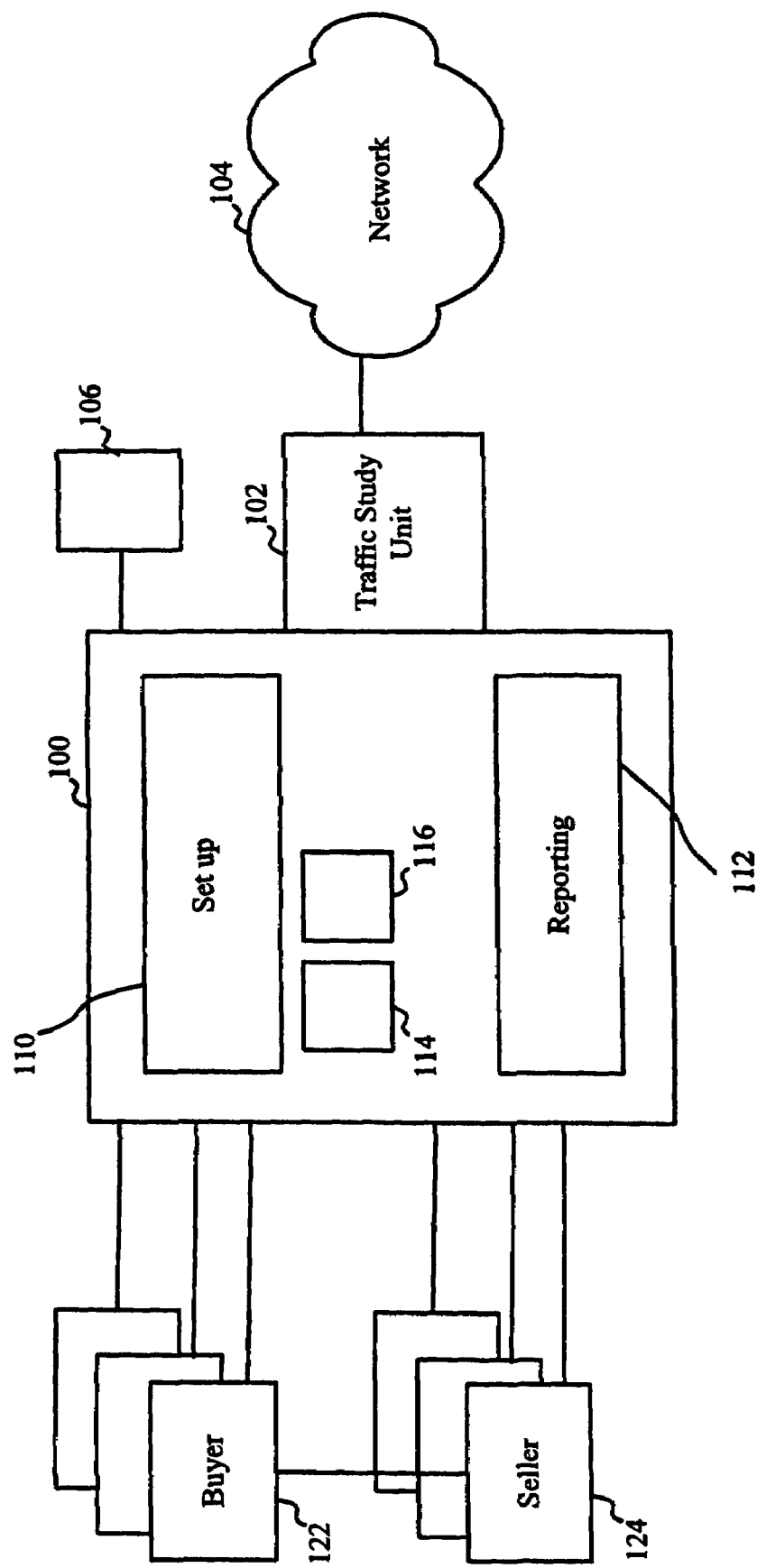
FIG. 1 is a schematic diagram of a system according to a preferred embodiment of the present invention.

FIG. 1 shows a schematic diagram that illustrates, in a very simple fashion, an exemplary system according to the present invention. As shown, the exemplary system includes traffic study unit 102, network 104, user directory 106, and system 100 of the present invention. Traffic study unit 102 is connected to network 104. Traffic study unit 102 performs traffic studies of network 104. Traffic study unit 102 may be an application or a group of applications that performs traffic studies. System 100 functions as a user interface of traffic study unit 102. A user submits an order for a traffic study and receive a report through system 100. User directory 106 contains a list of authorized users of system 100 and user information associated with each of the authorized users. The user information may include, for example, a user's name, a user's telephone number, and a user's e-mail address. User directory 106 can be either internal or external to system 100. Preferably, user director 106 is external to system 100.

System 100 and traffic study unit 102 can be provided as one system. Alternatively, system 100 and traffic study unit 102 can be provided as separate systems. A user of system 100 can be either seller 124 or buyer 122 of a report of a traffic study. Seller 124 can be a service provider. Buyer 122 can be a customer of the service provider. Buyer 122 can request a traffic study by contacting seller 124 to request a traffic study from system 100. Seller 124 preferably has direct connection to system 100. Seller 124 then connects to system 100 to submit an order for the traffic study on behalf of buyer 122.

System 100 includes set-up module 110, reporting module 112, and one or more databases. Preferably, system 100 includes first database 114 and second database 116. First database 114 may include, for example, PSIMS (Product Services Inventory Management System). System 100 obtains the Switch Type/CLLI for all NPA-NXX from first database 114. At this point, the central office location has been identified and eCATS can connect to the right switch to start verification. Second database 116 may include, for example, ATLAS (Application for TN Load Administration and Selection). System 100 checks LNP from second database 116 via an interface. The interface may be, for example, a CORBA interface. A ten-digit telephone number will be input and a status will be returned from second database 116 indicating ported status. Set-up module 110 provides tools that a user can use to submit an order for a traffic study. Set-up module 110 of system 100 receives an order for a traffic study from a user. System 100 may use first database 114 and second database 116 to verify a location of central office serving a facility or facilities to be studied. Preferably, system 100 may use first database 114 to verify a location of central office serving a facility or facilities to be studied. Further, preferably, system 100 may use second database 116 to determine whether a telephone number to be studied is an LNP number. First database 114 and second database 116 may be provided as one database. System 100 then initiates a traffic study in traffic study unit 102. When the traffic study is completed, reporting module 112 receives a report of the traffic study from traffic study unit 102 and forwards the report to the user. Preferably, system 100 can create a traffic study report and forward the report to the user. Preferably, system 100 is provided in Java based GUI (Graphical User Interface) application. System 100 can be quickly and easily accessed via the internet.

Preferably, system 100 includes security features, such as a user identification validation. System 100 may provide a login window for a user to submit a user identification and a password. System 100 verifies the submitted user identification. If the user is an unauthorized user, system 100 may send a message to the user indicating, for example, that the user is not authorized to use the system. If the user is an authorized user, system 100 allows access.

System 100 may display a CPNI (Customer Proprietary Network Information) disclaimer. The CPNI disclaimer includes a clause to comply with FCC (Federal Communications Commission) rules governing CPNI. A user may either agree or disagree with the CPNI disclaimer. Preferably, if the user disagrees with the CPNI disclaimer, system 100 automatically logs off the user. If the user agrees with the CPNI disclaimer, system 100 provides a status window that allows the user to view the status of the user's pending orders, if any pending orders exist.

FIG. 2 shows an exemplary status window 200. Preferably, system 100 assigns a tracking number and an order number for each order it receives. System 100 also assigns a study number for each study. An order may include multiple studies. As shown, status window 200 displays tracking numbers in first column 202, order numbers in second column 204, study numbers in third column 206, and status in fourth column 208. A status of an order can be viewed using different options. For example, a status can be viewed by using a tracking number. Alternatively, a status can be viewed by entering the date on which the traffic study was performed. Status window 200 may include pull down menus that list available options. Preferably, status window 200 also provides other options. For example, status window 200 may include "Modify Order" button 210 that allows the user to modify the order and "Cancel Order" button 212 that allows the user to cancel the order. Status window 200 may also include "Modify Study" button 214 and "Cancel Study" button 216 for each study. The user selects "New Order" button 218 to initiate a new order. After "New Order" button 218 is selected, system 100 provides a new order request window.

FIG. 3 shows an exemplary new order request window 300. Preferably, new order request window 300 includes customer (i.e., buyer) information section 302, user information section 304, study parameter section 306, and delivery options 308. Preferably, user information section 304 is populated by system 100. System 100 can preferably automatically extract user information from user directory 106. The user information corresponds with the user identification submitted in the log-in window. System 100 can preferably populate user information section 304 using the user information. By automatically populating user information section 304, system 100 eliminates errors caused by a user during manual provision of the user information. The user can preferably review the automatically populated user information in user information section 304 for accuracy. This enables the user to update the user information, if necessary.

The user can provide input in customer information section 304, study parameter section 306, and delivery options 308. For example, the user can provide input parameters for a traffic study to be performed in study parameter section 306. Preferably, the input parameters include, "Main List Number" 310, "Start/End Date" 312, "Start/End Time" 314, and "Study Days" field 316. "Main list number" 310 can be the telephone number to be studied. Pull down menus may be used. The user can select the day or days on which the traffic study is to be performed. Specifically, the user can select one or more days on which the traffic study is to be performed by selecting or checking the appropriate boxes in "Study Days" field 316. For example, for a seven-day study, the user may select all of the boxes in "Study Days" field 316. The "Start/End Date" may be set, as default, for the week following the input week. The "Start/End Time" may be set, as default, for 8 a.m. and 5 p.m., respectively.

The user can also select a preferred delivery method in delivery options 308. The user may select one or more of the deliver methods which include receiving the report, for example, by online, e-mail or facsimile. Preferably, system 100 provides error messages if errors occur while completing new order request window 300. For example, an error message may indicate, "A valid customer name must be provided." The user may cancel the order by selecting "Cancel" button 322. The user may proceed by selecting "Submit" button 320. Preferably, after "Submit" button 320 is selected, system 100 provides a new study request window.

Figure 4:
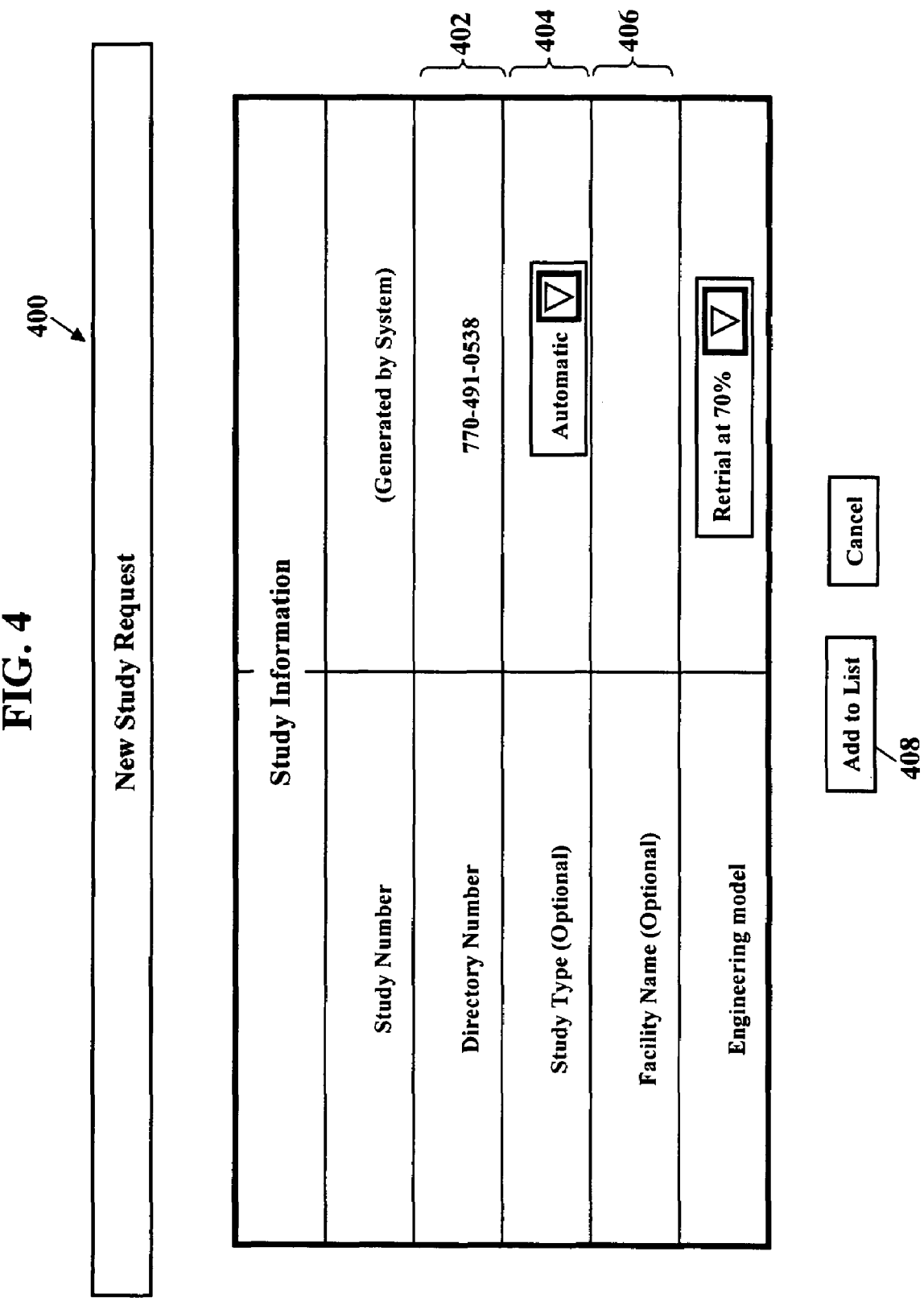
FIG. 4 is an exemplary new study request window according to a preferred embodiment of the present invention.

FIG. 4 shows an exemplary new study request window 400. Preferably, new study request window 400 includes "Directory Number" field 402, "Study Type" field 404, and "Facility Name" field 406. New study request window 400 may include drop down menus. The user can provide a telephone number to be studied in "Directory Number" field 402. Preferably, "Study Type" field 404 may be set for "automatic." Optionally, the user may provide input in "Study Type" field 404 and "Facility Name" field 406. System 100 can automatically provide information of a facility associated with the telephone number submitted in "Directory Number" field 402. The information of a facility includes, for example, a type of the facility and a name of the facility. System 100 can also provide the information of the facility with a partial input provided in, for example, "Facility Name" field 406.

Figure 5:
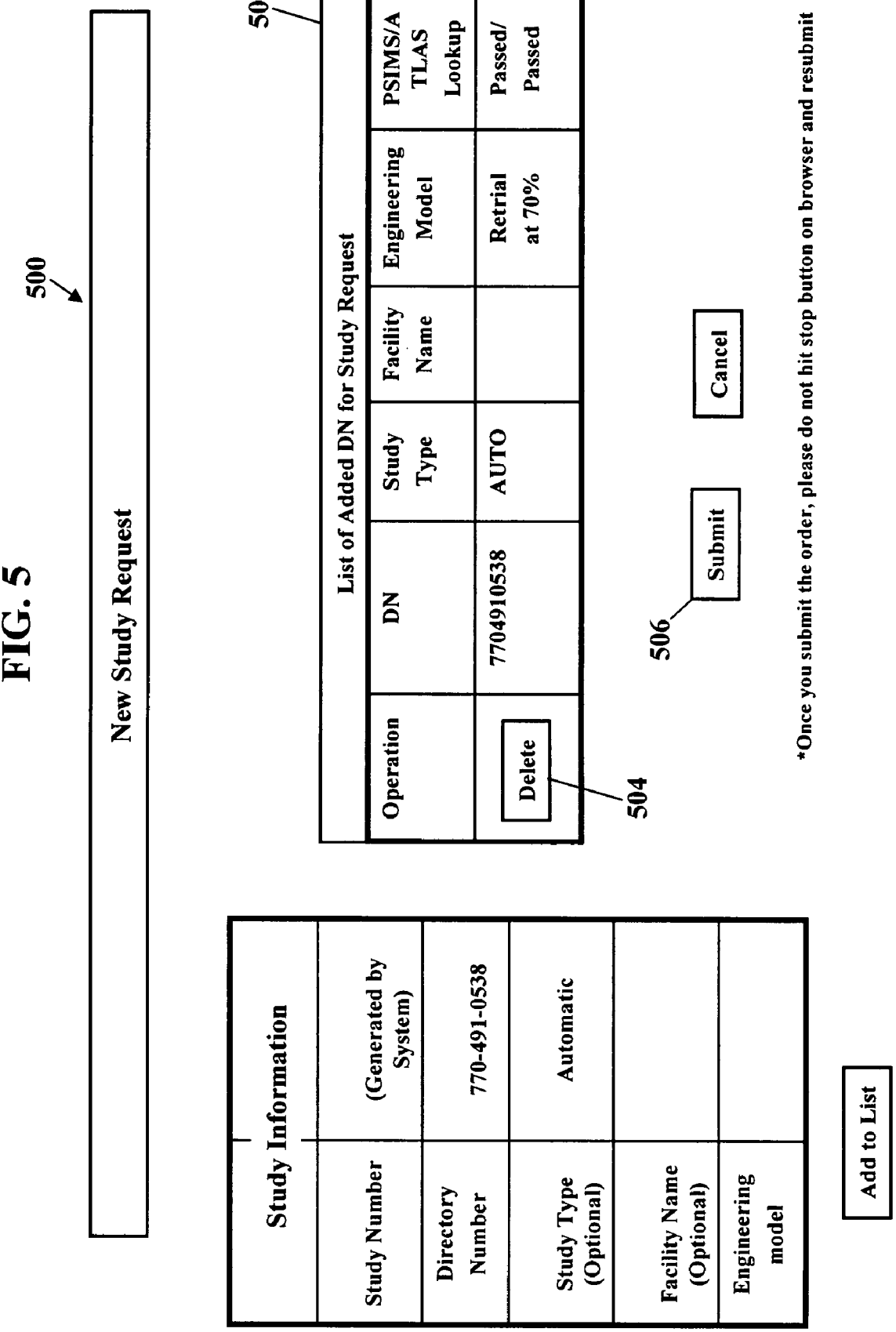
FIG. 5 is an exemplary new study request window according to another preferred embodiment of the present invention.

The user can request more than one study in one order. For example, the user can add a study by selecting "Add to List" button 404. Preferably, system 100 displays a list of added studies. FIG. 5 shows an exemplary new study request window 500 that includes a list of added studies 502. The user may delete the studies from the list of added studies by selecting "Delete" button 504. Once the studies are added, the user may submit the study request by selecting "Submit" button 506. System 100 may provide a tracking number for the order. The user can use the tracking number to track the order and the study the user requested. System 100 may also provide a confirmation of the order.

System 100 determines location of a central office that serves the telephone number identified in the study request. Preferably, the determination is made using the NPA-NXX part of the telephone number. System 100 can locate a central office switch where the telephone number is actually connected to, even for a local number portability (LNP) number. System 100 allows the user to study telephone numbers with different central office locations. Preferably, if a valid CLLI is received system 100 uses first database 114 (shown in FIG. 1) to verify the location of the central office. Otherwise, the user gets an error message. Further, preferably, system 100 may use second database 116 (shown in FIG. 1) to verify if the telephone number is an LNP number. System 100 may access central offices using CLLI (Common Language Location Identification).

System 100 automatically provides a report of a traffic study to a user who requested the traffic study following the completion of the traffic study. System 100 can provide a report in near real-time. System 100 can provide an intermediate report.

System 100 provides administrative reports for the system's administrator. The administrative reports may include, for example, a total number of orders and/or a total number of facilities studied per order.

System 100 provides indicators that indicate problems occurring during a traffic study. Preferably, system 100 notifies appropriate personnel when the problems occur. Rather than canceling the traffic study when the problems occur during the traffic study, system 100 sends a message to a hotlist and the correct study type can be selected from the hotlist. The hot list includes messages that inform a network assistant whether there is a problem with system 100 in verifying a telephone number. The hot list also helps determine the study type or whether there is a problem with eCATS in accessing a central office. Preferably, system 100 prepares the hot list hourly.

Figure 6:
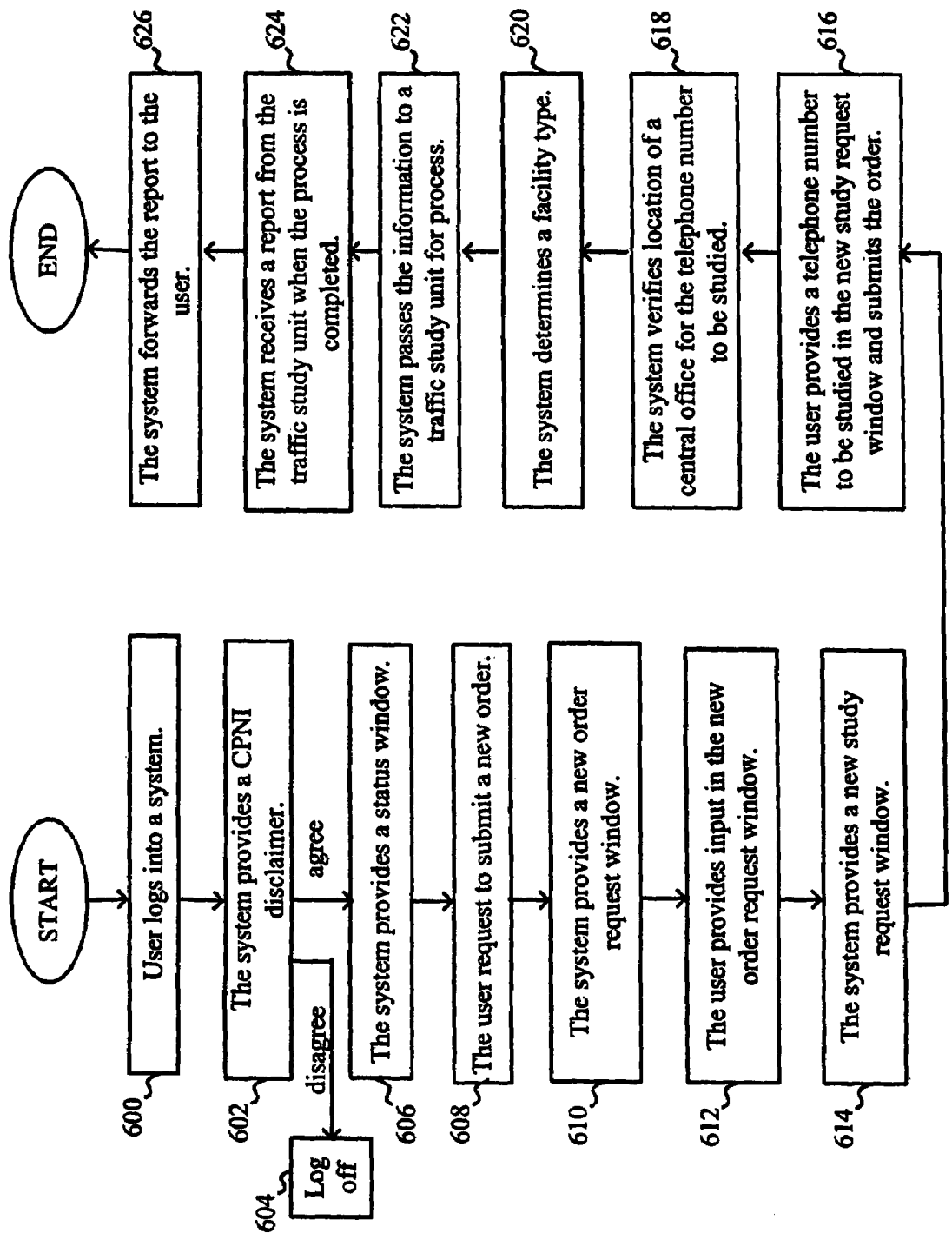
FIG. 6 is a flow chart according to a preferred embodiment of the present invention.

FIG. 6 shows a flow diagram illustrating an example of the operation of system 100 of the present invention and interaction of the user according to the present invention.

In step 600, the user logs into system 100 to submit an order for a traffic study. It is assumed that in this example the user is an authorized user. The user submits a user identification and a password in the login window. System 100 verifies that the user is the authorized user. Verification can be made based on information accessible to system 100.

In step 602, once the user is logged in, system 100 provides a window that displays the CPNI disclaimer. The user can either agree or disagree with the CPNI disclaimer. If the user disagrees with the CPNI disclaimer, system 100 logs off the user in step 604.

If the user agrees with the CPNI disclaimer, system 100 provides status window 200 (shown in FIG. 2) in step 606.

In step 608, to initiate to submit the order for the traffic study, the user selects "New Order" button 218 in status window 200.

In step 610, system 100 provides new order request window 300 (shown in FIG. 3). System 100 extracts user information from user directory 106 (shown in FIG. 1) and automatically populates user information section 304 in new order request window 300.

In step 612, the user provides customer information in customer information section 302 in new order request window 300. The user also provides input parameters needed for the traffic study in study parameter section 306. The user can also select a preferred delivery method. The user then selects "Submit" button 320.

In step 614, system 100 provides new study request window 400.

In step 616, the user provides a telephone number to be studied. The user can request more than one study by selecting "Add to List" button 404 in new study request window 400. Once all of the study requests are added, the user submits the request by selecting "Submit" button 506 in new study request window 500.

In step 618, system 100 verifies a location of a central office serving the telephone number submitted in step 616. System 100 also verifies if the submitted telephone number is an LNP number. If it is an LNP number served by the local telephone service provider in its own region, the process continues. Otherwise, the user receives an error message.

In step 620, system 100 determines a facility type of associated with the submitted telephone number. The facility type may include, for example, a single line, a trunk group, and a basic ISDN. Preferably, system 100 uses a study type look-up (STL). Preferably, the STL, through first database 114, does the verification of the telephone number. Once it has been identified by CLLI, the study information page is supplied with the study type. If the study type requires a facility name, this information is provided as well.

In step 622, system 100 initiates the traffic study in traffic study unit 102 (shown in FIG. 1) with the information obtained from step 606 to step 620. Traffic study unit 102 accesses the central office serving the submitted telephone number and performs the traffic study of the facility or facilities specified. A report is setup to collect data for the dates the user has requested in step 612.

In step 624, when the traffic study is completed, system 100 receives the report from traffic study unit 102. For example, the report may include a cover sheet and a grade of service that determines if the buyer needs to add or delete lines due to the needs of the buyer's business.

In step 626, system 100 forwards the report to the user via the preferred delivery method selected by the user in step 612.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method for processing a traffic study request in a communications network, comprising:
   validating a user identification received from a user;
   receiving customer information and input parameters from the user;
   receiving a plurality of telephone numbers from the user for which the traffic study is requested;
   determining whether any of the plurality of telephone numbers is a local number portability (LNP) number;
   if the local number portability number is served by a local telephone provider in a region associated with the local telephone provider, then continuing with the traffic study for the local number portability number and processing the traffic study to determine whether new telephone lines are required for the plurality of telephone numbers; and
   if the local number portability number is not served by the local telephone provider in the region associated with the local telephone provider, then discontinuing the traffic study for the local number portability number and sending an error message.

2. The method according to claim 1, further comprising determining a central office serving any of the plurality of telephone numbers.

3. The method according to claim 2, further comprising querying a database for the central office associated with a telephone number.

4. The method according to claim 1, further comprising reporting the traffic study.

5. The method according to claim 1, wherein determining whether any of the plurality of telephone numbers is the local number portability (LNP) number comprises querying a database for a telephone number.

6. The method according to claim 1, further comprising assigning a tracking number and an order number to the traffic study.

7. The method according to claim 6, further comprising assigning a study number to the traffic study.

8. The method according to claim 7, further comprising causing display of a graphical user interface that displays tracking numbers in a first column, order numbers in a second column, study numbers in a third column, and a status in a fourth column.

9. The method according to claim 7, further comprising acquiring a status of the traffic request by entering a date on which the traffic study was performed.

10. The method according to claim 7, further comprising acquiring a status of the traffic request by entering the tracking number.

11. The method according to claim 1, further comprising extracting user information from a user directory 106 and populating a graphical user interface with the user information.

12. The method according to claim 1, further comprising receiving a user's selection of multiple days on which the traffic study is to be performed.

13. The method according to claim 1, further comprising receiving a user's selection to cancel the traffic study.

14. The method according to claim 1, further comprising determining a location of a central office serving any of the plurality of telephone numbers.

15. The method according to claim 1, further comprising reporting a total number of facilities studied per order.

16. The method according to claim 1, when a telephone number cannot be verified, rather than canceling the traffic study, further comprising sending a message to a hotlist that informs a network assistant of problems.

17. The method according to claim 1, further comprising querying a database to obtain a switch type associated with each telephone number.

18. The method according to claim 1, further comprising assigning a single study number to multiple traffic studies performed for the plurality of telephone numbers.

19. A system for processing a traffic study request in a communications network, comprising:
   means for validating a user identification received from a user;
   means for receiving customer information and input parameters from the user;
   means for receiving a plurality of telephone numbers from the user for which the traffic study is requested;
   means for determining whether any of the plurality of telephone numbers is a local number portability (LNP) number;
   if the local number portability number is served by a local telephone provider in a region associated with the local telephone provider, then means for continuing with the traffic study for the local number portability number and means for processing the traffic study to determine whether new telephone lines are required for the plurality of telephone numbers; and
   if the local number portability number is not served by the local telephone provider in the region associated with the local telephone provider, then means for discontinuing the traffic study for the local number portability number and means for sending an error message.

* * * * *